(12) United States Patent
Bartholomay et al.

(10) Patent No.: US 6,539,023 B1
(45) Date of Patent: Mar. 25, 2003

(54) METHODS AND APPARATUS FOR HANDLING MAINTENANCE MESSAGES IN EXTENDED SUPERFRAME T1 TELEPHONE CIRCUITS

(75) Inventors: William G. Bartholomay, Orange, CT (US); Santanu Bhattacharya, Delhi (IN); Pushkal Yadav, New Delhi (IN); Balaraj Vishnu Varthanan, Tamil Nadu (IN)

(73) Assignee: Transwitch Corporation, Shelton, CT (US)

(*) Notice: Subject to any disclaimer, the term of this patent is extended or adjusted under 35 U.S.C. 154(b) by 0 days.

(21) Appl. No.: 09/161,907

(22) Filed: Sep. 28, 1998

(51) Int. Cl.$^7$ ................................................. H04L 12/56
(52) U.S. Cl. ....................................... 370/412; 370/472
(58) Field of Search ............................... 370/241.1, 250, 370/412, 428, 470, 471; 379/1.02, 1.03, 1.04, 472

(56) References Cited

U.S. PATENT DOCUMENTS

| | | | | |
|---|---|---|---|---|
| 5,550,914 A | * | 8/1996 | Clarke et al. | 379/230 |
| 5,563,885 A | * | 10/1996 | Witehey | 370/94.2 |
| 6,091,712 A | * | 7/2000 | Pope et al. | 370/244 |
| 6,256,334 B1 | * | 7/2001 | Adachi | 375/132 |
| 6,205,143 B1 | * | 3/2002 | Lemieux | 370/395 |

OTHER PUBLICATIONS

"Requirements for interfacing digital terminal equipment to services employing the extended superframe format" AT&T Tech. Ref 54016, Issue 2, Sep. 1989.

ITU–T Q.921," ISDN User–network interface–data link layer specification", Mar. 1993, 166 pages.

ANSI T1.403.CORE–199x,"Network and customer installation interfaces–DS1 Electrical Interface", 1995, 72 pages.

ANSI T1.102.01–1996, "Digital Hierarchy VT1.5 Electrical Interface".

ANSI T1.231–1997, "Digital Hierarchy– Layer 1 in–service digital transmission performance monitoring", 106 pages.

ANSI–T1.403–197, "Network–to–Customer installation– DS1 Metallic Interface", 65 pages.

* cited by examiner

*Primary Examiner*—Alpus H. Hsu
*Assistant Examiner*—Thien Tran
(74) *Attorney, Agent, or Firm*—David P. Gordon; David S. Jacobson; Thomas A. Gallagher

(57) ABSTRACT

An apparatus for handling back-to-back maintenance messages in extended superframe t1 telephone circuits includes a FIFO, a byte counter, and a message length register. According to ga method of the invention, when messages are placed in the. FIFO, the byte counter counts the message length and places the message length in the message length register. A host controller is required to read the message length register in the time interval following complete receipt of a first message before complete receipt of a second message, but is only required to read the contents of the FIFO before it overflows. According to a presently preferred embodiment of the apparatus, a second register is provided for indicating the current depth of the FIFO. The second register sends an interrupt to the host controller when the contents of the FIFO exceed a threshold.

21 Claims, 2 Drawing Sheets

METHODS AND APPARATUS FOR HANDLING MAINTENANCE MESSAGES IN EXTENDED SUPERFRAME T1 TELEPHONE CIRCUITS

BACKGROUND OF THE INVENTION

1. Field of the Invention

The invention relates to digital telecommunications. More particularly, the invention relates to methods and apparatus for buffering maintenance messages received from the T1 ESF data link channel.

2. State of the Art

The first commercial digital voice communications system was installed in 1962 in Chicago, Ill. The system was called "T1" and was based on the time division multiplexing (TDM) of twenty-four telephone calls on two twisted wire pairs. The digital bit rate of the T1 system was 1.544 Mbit/sec (±200 bps), which was, in the nineteen sixties, about the highest data rate that could be supported by a twisted wire pair for a distance of approximately one mile. The cables carrying the Ti signals were buried underground and were accessible via manholes, which were, at that time in Chicago, spaced approximately one mile (actually, 6000 ft.) apart. Thus, analog amplifiers with digital repeaters were conveniently located at intervals of approximately one mile.

The T1 system is still widely used today and forms a basic building block for higher capacity communication systems including T3 which transports twenty-eight T1 signals. The designation T1 was originally coined to describe a particular type of carrier equipment. Today T1 is often used to refer to a carrier system, a data rate, and various multiplexing and framing conventions. While it is more accurate to use the designation "DS1" when referring to the multiplexed digital signal formed at an 8 KHz rate and used to carry twenty-four voice channels by the T1 carrier, the designations DS1 and T1 are often used interchangeably. Today, T1/DS1 systems still have a data rate of 1.544 Mbit/sec and support up to twenty-four voice and/or data DS0 channels. Similarly, the designations DS2 and T2 both refer to a system transporting up to four DS1 signals (96 DS0 channels) and the designations DS3 and T3 both refer to a system transporting up to seven DS2 signals (672 DS0 channels). The timing tolerance for modern T1 equipment has been raised to ±50 bps.

The most recent standardized specifications for T1/DS1 systems are contained in several published standards including ANSI T1.102, ANSI T1.231, ANSI T1.403 and ITU-T Recommendation Q.921, the complete disclosures of which are hereby incorporated herein by reference. It is worth noting that the T1 system is substantially the same in North America and Japan but is different in Europe where it is known as "E1", has a data rate of 2.048 Mbit/sec and multiplexes up to thirty voice and/or data channels with signaling, or up to thirty-one voice-and/or data channels without signaling.

The current standard for T1/DS1 systems incorporates many improvements and enhancements over the original T1 system. The basic T1 system is based on a frame of 193 bits, i.e. twenty-four 8-bit channels (the payload) and one framing bit (F). According to today's standards, the 192 bit payload need not be "channelized" into 24 DS0 channels. In addition, superframe and extended superframe formats have been defined. The superframe (SF) format is composed of twelve consecutive T1 frames, i.e. approximately 1.5 milliseconds of a T1 signal. In the SF format, the twelve framing bits F are divided into two groups, six terminal framing bits $F_t$ and six signalling framing bits $F_s$. The $F_t$ bits are used to identify frame boundaries and the $F_s$ bits are used to identify superframe boundaries. When the frames are DS0 channelized, the $F_s$ bits are also used to identify signalling frames. The extended superframe (ESF) format is composed of twenty-four consecutive T1 frames, i.e., approximately 3 milliseconds of a T1 signal. In the ESF format, the twenty-four F bits are divided into three groups. Six F bits are used to provide a 2 kbps framing pattern sequence (FPS) which-is used to identify the frame and ESF boundaries. When the frames are DS0 channelized, the FPS is to identify signalling frames. Another six of the F bits are used to provide a 2 kbps CRC (cyclic redundancy check error checking) channel utilizing a CRC-6 code. The remaining twelve F bits are used to provide a 4 kbps data link (DL) channel. The DL channel is sometimes referred to as the "FDL channel" or "FDL link" where DL stands for data link and F stands for facility or facilities.

In addition to modern framing conventions, the present T1 specification also includes provisions for different "line codes", sometimes referred to as "transmission codes". It will be appreciated that the T1 signal is a plesiochronous (tightly controlled asynchronous) signal and, unlike a synchronous signal, is still subject to wander, jitter, and slips. Line codes are encoding conventions which are designed to facilitate bandwidth limitations, clock recovery, and error detection. One popular line code is known generally as alternate mark inversion (AMI or bipolar line code). AMI utilizes a ternary signal (positive, negative, and null) to convey binary digits (zero and one). Successive binary ones are represented by signal elements of alternate polarity and of equal magnitude. Binary zeros are represented by signal elements having zero amplitude. Under the AMI line code, a non-zero signal element which follows a non-zero signal element of the same polarity is called a "bipolar violation". AMI line code spectral density is one-half the bit rate and it has no DC component.

The T1 signal is also conditioned by pulse density requirements, i.e. the minimum number of "ones" (marks or pulses) which must be present in given number of binary digits or "time slots". Pulse density requirements prevent jitter build-up due to a lack of pulses to retain clocking and a lost signal from being to mistaken for a long string of zero bits. Thus, digital codes containing zero strings greater than fifteen zeros are restricted from being transmitted. An enhancement to the basic AMI line code which helps meet pulse density requirements and places no restrictions on the transmitted data is known as "bipolar with 8-zero substitution" (B8ZS). The B8ZS line code provides that blocks of eight consecutive zeros are replaced with a unique eight bit code, i.e. 000VB0VB, where B represents a non-zero signal element conforming to the bipolar rule and V represents a bipolar violation. Another system for meeting pulse density requirements is known as "zero-byte time slot interchange" (ZBTSI). According to ZBTSI, eight consecutive zeros are replaced by an address chain that is decoded by the receiving terminal. As mentioned above, these transmission codes are based on the nature of the T1 carrier and not on the DS1 multiplexing scheme. Today, a DS1 transmission path may be provided on media other than a T1 carrier. A DS1 transmission path which is synchronous (e.g. via SONET) and does not utilize line codes with data restrictions or pulse density requirements is said to have "clear channel capability".

The present standards for SF and ESF formats provide means for sending maintenance signals and maintenance messages. Exemplary maintenance signals include Remote Alarm Indication (RAI, or "yellow alarm"), Alarm Indication Signal (AIS), and, more recently, trouble sectionalization signals (RAI-CI and AIS-CI) which identify whether trouble exists at the customer installation (CI) or the network interface (NI). Other maintenance signals include loopbacks and loopback control signals. In the SF format maintenance signals are transmitted in-band (in one or more DS1 channels or in a T1 frame). In the ESF format, most maintenance signals are transmitted in the DL channel; although some signals, such as remote loop up/down, may be transmitted alternatively in-band.

The RAI signal is transmitted in the outgoing direction when DS1 terminal equipment located in either the network or the customer installation has effectively lost the incoming signal. The detailed requirements for sending an RAI signal are contained in previously incorporated ANSI T1.231. An RAI is transmitted to the NI in several forms. In the SF format, for the duration of channel time-slot shall be a zero. In the ESF format, for the duration of the alarm condition, but for at least one second, a repeating 16-bit pattern of eight "ones" followed by eight "zeros" is transmitted continuously on the ESF DL channel, but may be interrupted for a period of 100 milliseconds per interruption for other "bit patterned messages". Bit patterned messages (which include RAI) are preemptive messages which will overwrite other signals in the DL channel such as LAPD messages described below.

The AIS (Alarm Indication Signal) maintenance signal is transmitted in place of the normal T1 signal under certain specified conditions such as when an equipment experiences a loss of input signal (LOS) or is being placed in a maintenance state such as a loopback. The AIS signal is designed to be readily recognized by all equipment regardless of the framing or line codes employed. The AIS signal defined in previously incorporated in ANSI T1.231 is a signal having a pulse density of 99.9% for a period $\geq T$, where 3 milliseconds$\leq T \leq$75 ms. The minimum time of 3 milliseconds was chosen so that an AIS which was corrupted by a bit error ratio (BER) of up to $1 \times 10^{-3}$ could be differentiated from a normal (framed) signal having a payload of all ones.

The recently defined trouble sectionalization signals (RAI-CI and AIS-CI) identify whether trouble exists at the customer installation (CI) or the network interface (NI). More particularly, the RAI-CI signal is a repetitive pattern with a period of 1.08 seconds. It is formed by sequentially interleaving 0.99 seconds of the RAI (ESF) signal with 90 milliseconds of a "bit patterned message", i.e. eight "ones" followed by one "zero", followed by five "ones", followed by two "zeros". The RAI-CI signal may only be used in the ESF format. The AIS-CI signal is a repetitive.pattern with a period of 1.26 seconds. It is formed by sequentially interleaving 1.11 seconds of an unframed all ones pattern (the AIS signal) with 0.15 seconds of a modified all ones pattern. The AIS-CI signal is defined as a pattern which recurs at 3.86 bit intervals in the DS1 signal. In other words, each 386th bit of an AIS signal is overwritten by another repetitive pattern, i.e. eight "ones", followed by two "zeros", followed by five "ones", followed by one "zero". The AIS-CI pattern therefore repeats once every 6176 bits and differs from an ordinary AIS pattern in that bit numbers 3088, 3474, and 5790 are "zeros" rather than "ones". The AIS-CI signal may be used in any of the T1 frame formats and meets the 99.9% all-ones criteria for AIS for equipment which cannot distinguish AIS-CI from AIS.

Unlike maintenance signals which are bit-patterned repeated signals, maintenance messages utilize the LAPD (link access procedure on the D channel) protocol. Maintenance messages include requests received from the network and responses transmitted to the network which are.sent in packets or frames in the DL portion of the ESF signal. The original purpose of maintenance messages was to allow the network to retrieve parameters regarding system performance, to reset counters, accumulators and registers used in computing performance parameters and to activate and deactivate "payload loopback" (PLB). The original maintenance messages (Performance Report Messages or PRM) were sent at regular intervals (every second) from each end of the T1 link, and each had the same message length of 15 octets (one byte flag+three bytes of address and control+eight bytes of data+two bytes CRC-16+one byte flag). The flag byte is defined as "01111110". According to the LAPD, this bit pattern is protected by a system known as "zero stuffing". In order to prevent the flag pattern from inadvertently appearing in the bit stream between opening and closing flags, a transmitter will insert a zero after every sequence of five consecutive ones between flags. According to LAPD, receivers will remove the stuffed zeros. It should be noted that the maintenance messages retrieved from the data link need to be kept in order, but do not need to be processed in real time as their value is in the history they provide of the performance of the T1 line.

According to the prior art, HDLC (high level data link control) equipment utilizes FIFO buffers to buffer received maintenance messages before they are read by a host controller. The HDLC equipment monitors the DL channel, strips opening and closing flags from messages, removes stuffed zeros, and generally reconstitutes the original message. The "extracted" message is placed in the FIFO where it resides until the host controller fetches it. This system operates well when the frequency of message reception is not faster than the latency of the host controller. In applications where messages arrive more frequently, it has been known to use parallel FIFOs which are written to and read from alternately.

Recently, the T1 standards have adopted a wide variety of maintenance messages having variable lengths (up to 79 message octets), and have also provided additional performance report messages that may be generated at intermediate points along a T1 path for the purpose of sectionalizing performance degradation. These new maintenance messages are generally referred to as "network performance report messages" or NPRMs and they are distinguishable from periodic performance report messages described above through the use of different addresses. The NPRMs are also sent at regular (e.g., 1 second) intervals, and are optionally generated by intermediate equipment on a DS1 circuit.

The introduction of these additional maintenance messages has complicated the buffering-of messages for the host controller. In particular, under the present scheme, several messages of different sizes may be received "back-to-back", i.e. two consecutive messages separated by a single flag. Under the traditional FIFO buffering schemes, only one message may be kept in the buffer and that message must be read before another message may be placed in the FIFO. One solution to the problem of buffering back-to-back messages has been to provide multiple FIFOs. However, this solution does not make efficient use of the FIFOs since large FIFOs must be used for small messages. Another proposed solution to the problem of buffering back-to-back messages of variable length has been to use a linked list containing an index of several messages in the FIFO so that they can be properly read. However, this solution requires additional overhead and complicated software for managing the buffer pool and for reading messages from the FIFO.

SUMMARY OF THE INVENTION

It is therefore an object of the invention to provide methods and apparatus for handling maintenance messages in extended superframe T1 telephone circuits which makes efficient use of FIFO buffers.

It is also an object of the invention to provide methods and apparatus for handling maintenance messages in extended superframe T1 telephone circuits which is relatively easy to implement.

It is another object of the invention to provide methods and apparatus for handling maintenance messages in extended superframe T1 telephone circuits which makes efficient use of a single FIFO buffer.

In accord with these objects which will be discussed in detail below, an apparatus of the present invention includes a FIFO, a byte counter, and a message length register. According to a method of the invention, when messages are placed in the FIFO by HDLC equipment, the byte counter counts the message length and places the message length in the message length register at the end of each message. A host controller must read the message length register in the time interval following complete receipt of a first message before complete receipt of a second message, but need not read the contents of the FIFO until it is about to overflow. According to a presently preferred embodiment of the apparatus, a second register is provided for indicating the current depth of the FIFO. The second register is coupled to the byte counter and maintains a cumulative total of all the bytes placed in the FIFO. According to a presently preferred method, the second register sends an interrupt to the host controller when the FIFO reaches a desired threshold is (e.g. more than 50% full) and/or is close to overflow. When the host controller receives an interrupt from the second register, at least some of the contents of the FIFO are read and the second register is decremented. Absent an interrupt from the second register, the host controller reads the contents of the. FIFO (and decrements the second register) whenever it is convenient for the host controller.

According to one embodiment of the invention, when messages are placed in the FIFO, the HDLC equipment places data in a status register indicating that a new message has been received and including information about the integrity of the message. The status register interrupts the host controller and the host controller then reads the first register along with the message status. According to an alternate embodiment, the host controller periodically reads (i.e. polls) the first register and resets the register each time it is read. According to yet another embodiment, a message length and status FIFO is used in place of the message length register and status register and permits multiple messages to be stored in the FIFO, with information concerning each message (e.g., status and length) to be stored in a separate FIFO, thereby permitting even more latency for a host controller.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
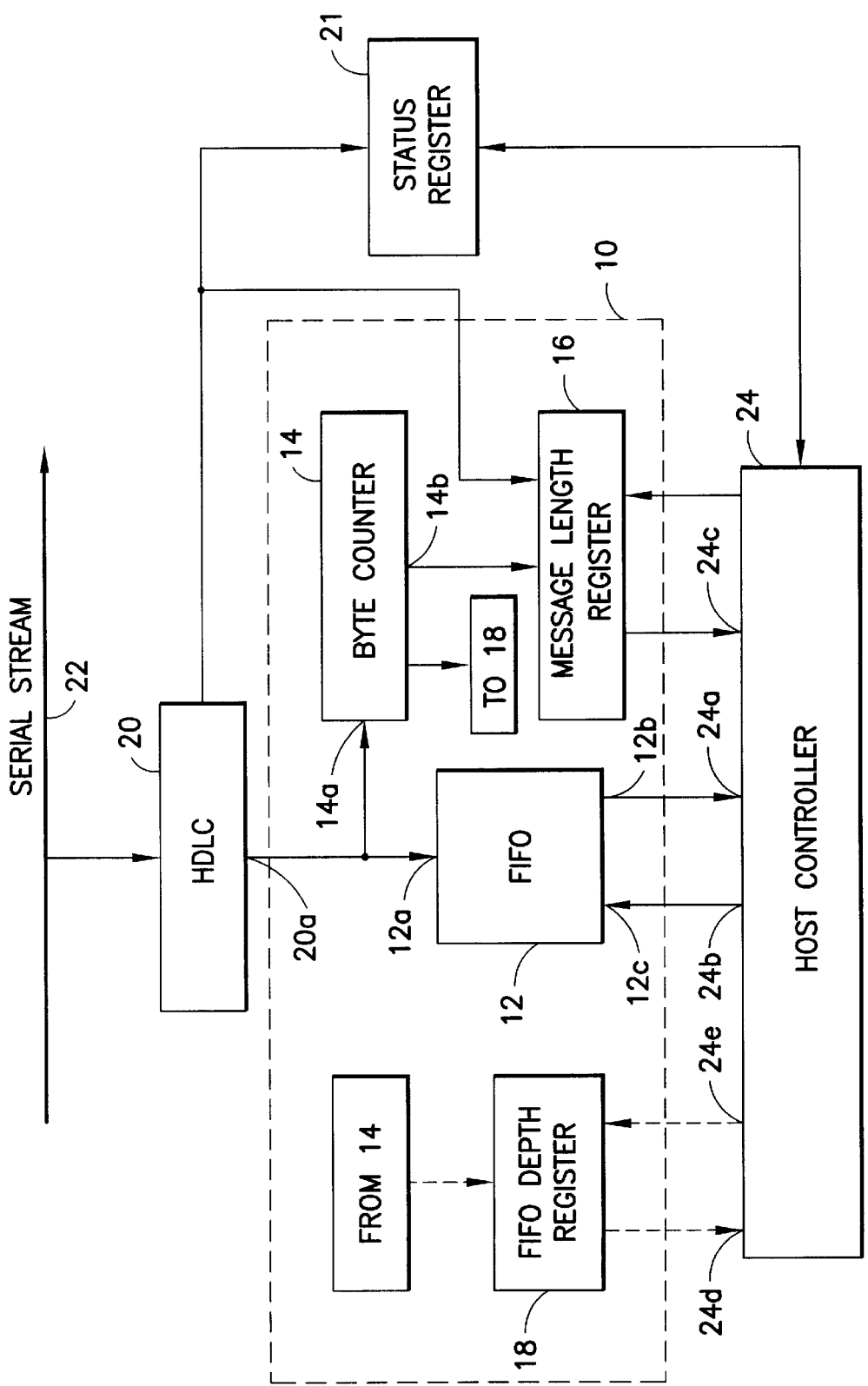
FIG. 1 is a schematic block diagram of an apparatus according to the invention coupled to HDLC equipment and a host controller.

Turning now to FIG. 1, an apparatus 10 according to the present invention includes a FIFO 12, a byte counter 14, a message length register 16, and, optionally, a FIFO depth register 18. The input 12a of FIFO 12 is coupled to an output 20a of HDLC equipment 20 which monitors the bit stream 22 of a T1 circuit to determine the contents of the DL channel. The output 12b of the FIFO 12 is coupled to an input 24a of a host controller 24 and an output 24b of the host controller 24 is coupled to the read enable input 12c of the FIFO for reading FIFO contents. An input 14a of the byte counter 14 is also coupled to the output 20a of HDLC equipment 20 and counts the number of bytes sent from the HDLC equipment 20 to the FIFO 12. An output 14b of the byte counter 14 is coupled to the message length register 16 such that the byte count (length) of the most recent message placed in the FIFO is stored in the message length register 16. The message length register 16 is also coupled to an input 24c of the host controller 24 such that the controller 24 may read the data stored in the message length register 16.

From the foregoing, those skilled in the art will appreciate that the HDLC equipment 20 monitors the DL channel, strips flags from messages, removes stuffed zeros, and generally reconstitutes the original message. The "extracted" message is placed in the FIFO 12 where it resides until the host controller 24 fetches it by activating the enable input 12c. According to the invention, as messages are sent from the output 20a of the HDLC equipment 20 to the FIFO 12, the byte counter 14 counts the message length. The message length is captured in the message length register 16 when the HDLC equipment 20 has identified the end of the message, at which time the HDLC equipment 20 also loads the status register 21. The host controller 24 must read the message length register 16 before the next consecutive message is completely received and must read the contents of the FIFO 12 before it overflows.

According to a presently preferred embodiment of the apparatus, a FIFO depth register 18 is provided and coupled to an input 24d of the host controller 24 for indicating the current depth of the FIFO 12. The depth register 18 preferably receives input from the byte counter 18 and maintains a cumulative total of the number of bytes in the FIFO 12. According to a presently preferred embodiment, the register 18 sends an urgent interrupt to the host controller 24 when the total number of bytes in the FIFO 12 is more than a certain threshold (e.g., 50%) of the total byte depth of the FIFO. When the host controller 24 receives this urgent interrupt, at least some of the contents of the FIFO 12 are read and the depth register is decremented via a decrement output 24e of the host controller.

As mentioned above, the host controller 24 must read the message length register 16 before the next consecutive message is completely received. The invention presents two alternate embodiments for satisfying this requirement. According to one embodiment, the host controller 24 polls the message length register 16 at regular intervals. The length of the intervals will be explained herein below with reference to FIG. 2. According to this embodiment, the host controller resets (zeros) the message length register 16 via a reset output 24f each time the message length register 16 is polled and read in order to prevent erroneous double reading of the same information. According to an alternate embodiment, the HDLC equipment 20 writes a message to a status register 21 each time a message is received and placed in the FIFO 12. Preferably, the message includes information about the integrity of the message, e.g. CRC failure or success, incomplete reception, etc. Upon receipt of a message from the HDLC equipment 20, the status register 21 sends an interrupt to the host controller 24 which prompts the host controller 24 to read the message length register 16 and the status register 21. According to this embodiment there is no need for the host controller to reset the message length register since the message length register will only be read by the host controller when it contains new information.

With the foregoing in mind, those skilled in the art will appreciate that the host controller 24 is freed of the requirement that each message in the FIFO 12 be read before another message can be received. A plurality of messages can be stored in the FIFO 12 before any of them need to be read. The host controller 24 need only read the contents of the message register 16 in a timely manner and respond to interrupts from the FIFO depth register 18 in order to assure that no messages are lost.

In order to further increase the latency for the host controller, and in accord with an alternative embodiment of the invention, the status register 21 and the message length register 16 may be replaced by FIFOs.

Figure 2:
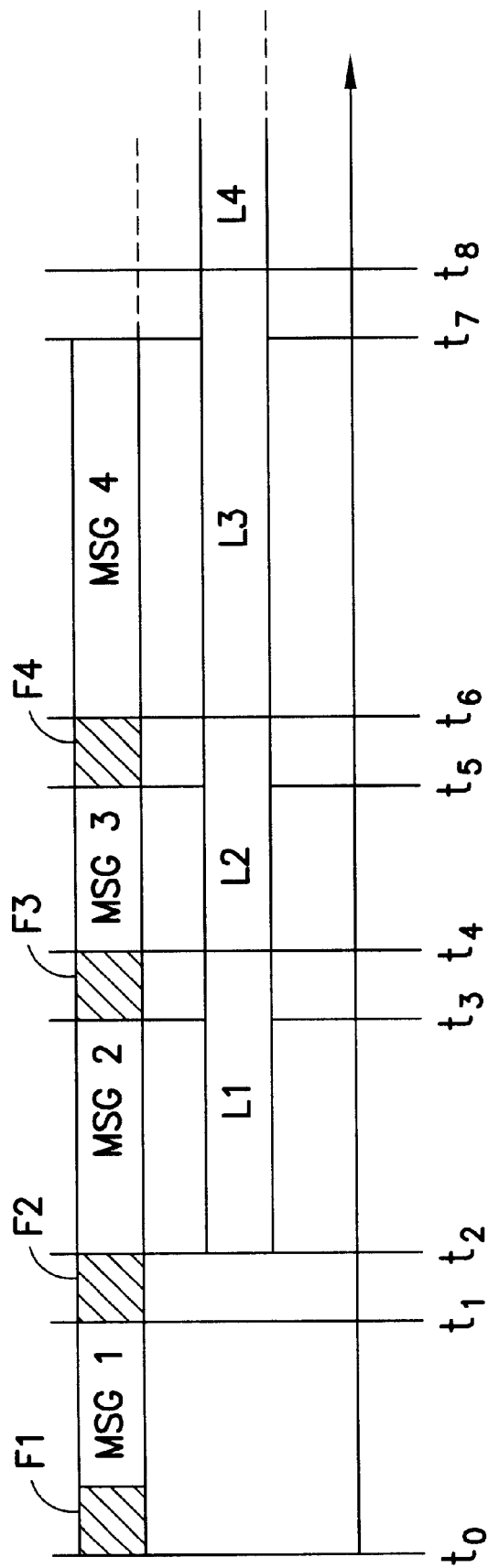
FIG. 2 is a time line-illustrating the changing content of the message length register relative to the receipt of messages by the FIFO in the apparatus of FIG. 1.

The timing constraint placed on the host controller 24 for reading the contents of the message length register is illustrated in the time line of FIG. 2 where the upper portion of the Figure illustrates the time elapsed during receipt of back-to-back messages and the lower portion of the Figure illustrates the times at which the contents of the message length register changes. Referring now to FIG. 2, a first message MSG1 arrives at the HDLC (20 in FIG. 1) when its flag F1 begins to be detected at time t0. Receipt of the message is completed at t1 whereupon receipt of the flag F2 of a second "back-to-back" message MSG2 begins. It will be appreciated that at time t1, the byte counter (14 in FIG. 1) ceases counting bytes and does not resume counting bytes until time t2 after the second message flag F2 has been stripped off by the HDLC equipment and the bytes of the second message MSG2 begin to be sent to the FIFO at t2. Thus, at some time between t1 and t2, the length L1 of the message MSG1 is determined and loaded into the message length register (16 in FIG. 1).

According to the presently preferred embodiment, the HDLC equipment 20 in detecting a closing flag, checks the CRC-16 and other message details and causes the total byte count to be loaded into the message length register. The time period of no byte counting may be as little as an eight-bit interval which is the duration of a single flag. Thus, according to the presently preferred embodiment, the length L1 of the first message MSG1 is available in the message length register between times t2 and t4, i.e. until the third message MSG3 begins being sent to the FIFO. At time t4, the contents (the length L1 of MSG1) of the message length register are overwritten with the length L2 of the second message MSG2. It will thus be appreciated that the length L2 of the second message MSG2 will remain available in the message length register until receipt of the third message MSG3 is complete at t5 and counting of the length of fourth message MSG4 begins at t6. As shown in FIG. 2, if MSG4 is the last message received for some unspecified period of time, the length L4 of MSG4 will remain in the message length register for some unspecified period of time starting at t8, the flag duration time-out following the counting of the length of MSG4.

Those skilled in the art will appreciate that the rate at which the contents of the message length register changes is variable depending on the length of the messages received. In other words, long messages take a longer time to receive and count their length than short messages. Thus, during receipt of a long message, the length of the previously received message will remain in the message length register for a longer time than during the receipt of a short message.

In order to assure that the host controller reads the message length register in a timely manner when utilizing the polling embodiment described above, the host controller is programmed to poll the message length register at intervals shorter than the time needed to receive the shortest message. For example, for LAPD, the shortest message is an opening flag, three address bytes, two CRC bytes, and a closing flag.

It will also be appreciated that HDLC equipment in the art may be made responsible for controlling several T1 data streams through a single "switch" which is controlled by a single host controller. In such an embodiment, each T1 data stream will be provided with its own buffer, counter, and registers. These different buffers, counters, and registers can be easily implemented by software in the host controller which assigns different areas of RAM for storing the various data.

It should be appreciated, that for high density applications where back-to-back messages of various lengths are to be received, the data FIFO needs to be sized to satisfy only the latency required of the host controller. For single messages that exceed the length of the data FIFO 12, the FIFO depth register is used directly to indicate the message length for reading purposes by to the host controller 24.

There have been described and illustrated methods and apparatus for handling maintenance messages in extended superframe T1 telephone circuits. While particular embodiments of the invention have been described, it is not intended that the invention be limited thereto, as it is intended that the invention be as broad in scope as the art will allow and that the specification be read likewise. For example, many of the elements of the invention may be implemented in either hardware, software, or a combination of hardware and software. Also, the byte counter may be a bit counter and message lengths may be indicated in either bits or bytes. It will therefore be appreciated by those skilled in the art that yet other modifications could be made to the provided invention without deviating from its spirit and scope as so claimed.

What is claimed is:

1. An apparatus for buffering maintenance messages in an extended superframe T1 telephone circuit having HDLC equipment and a host controller, said apparatus comprising:

a) a FIFO buffer having an input and an output, said input of said FIFO buffer being coupled to a maintenance message output of the HDLC equipment, said output of said FIFO buffer being coupled to a maintenance message input of the host controller;

b) a counter coupled to the maintenance message output of the HDLC equipment and having a count output;

c) a message length storage means for storing length indications, said message length storage means coupled to said count output and having a read output coupled to a message length input of the host controller, wherein the HDLC equipment places maintenance messages in said FIFO buffer, said counter counts the length of each maintenance message placed in said FIFO buffer and stores an associated length indication in said message length storage means, and the host controller reads the contents of said message length storage means to determine the starting and ending locations of maintenance messages in said FIFO buffer.

2. An apparatus according to claim 1, wherein:

said message length storage means is a message length register, and said counter overwrites the contents of said message length register each time a new maintenance message is received.

3. An apparatus according to claim 2, wherein:
said message length register is read by the host controller each time a new maintenance message is received.

4. An apparatus according to claim 1, wherein:
said counter is a byte counter.

5. An apparatus according to claim 1, further comprising:
d) a FIFO buffer depth register, said depth register coupled to said counter and to the host controller, wherein
said depth register accumulates a running total of the number of bytes in said FIFO and sends an interrupt to the host controller when the number of bytes in said FIFO reaches a predetermined threshold.

6. An apparatus according to claim 1, further comprising:
d) a status storage means coupled to the HDLC equipment and to the host controller for receiving a message from the HDLC equipment each time a message is placed in said FIFO and for sending an interrupt to the host controller each time it receives a message from the HDLC equipment.

7. An apparatus according to claim 6, wherein:
said status storage means is a status register.

8. An apparatus according to claim 6, wherein:
said status storage means-is a status storage FIFO, and said message length storage means is a message length FIFO.

9. An apparatus for buffering maintenance messages in an extended superframe T1 telephone circuit, said apparatus comprising:
a) HDLC equipment coupled to the T1 circuit and monitoring the data link channel of the T1 circuit, said HDLC equipment having a maintenance message output;
b) a FIFO buffer having an input and an output, said input of said FIFO buffer being coupled to said maintenance message output of said HDLC equipment;
c) a counter coupled to said maintenance message output of said HDLC equipment and having a count output;
d) a message length storage means for storing a message length indication, said message length storage means coupled to said count output and having a read output; and
e) a host controller having a maintenance message input and a message length input, said output of said FIFO buffer being coupled to said maintenance message input and said read output of said message length storage means being coupled to said message length input, wherein
said HDLC equipment places maintenance messages in said FIFO buffer,
said counter counts the length of each maintenance message placed in said FIFO buffer and stores an indication of the length in said message length storage means, and
said host controller reads the contents of said message length storage means to determine the starting locations of maintenance messages in said FIFO buffer.

10. An apparatus according to claim 9, wherein:
said message length storage means is a message length register, and said counter overwrites the contents of said message length register each time a new maintenance message is received.

11. An apparatus according to claim 10, wherein:
said message length register is read by said host controller each time a new maintenance message is received.

12. An apparatus according to claim 9, wherein:
said counter is a byte counter.

13. An apparatus according to claim 9, further comprising:
f) a FIFO buffer depth register, said depth register coupled to said counter and to the host controller, wherein
said depth register accumulates a running total of the number of bytes in said FIFO and sends an interrupt to the host controller when the number of bytes in said FIFO is greater than a predetermined threshold.

14. An apparatus according to claim 9, further comprising:
f) a status storage means coupled to the HDLC equipment and to the host controller for receiving a message from the HDLC equipment each time a message is placed in said FIFO and for sending an interrupt to the host controller each time it receives a message from the HDLC equipment.

15. An apparatus according to claim 14, wherein:
said status storage means comprises a status register, and said message length storage means comprises a message length register.

16. An apparatus according to claim 14, wherein:
said status storage means comprises a status FIFO, and said message length storage means comprises a message length FIFO.

17. A method of buffering maintenance messages in an extended superframe T1 telephone circuit having HDLC equipment, said method comprising:
a) counting the length of each maintenance message from the HDLC equipment as it is received;
b) storing an indication of the length of each maintenance message in a message length storage means;
c) storing each message in a FIFO buffer;
d) reading the contents of the message length storage means each time a message is received so that the length of each message stored in the FIFO buffer is known; and
e) reading the contents of the message length storage means to determine the starting and ending locations of maintenance messages in the FIFO buffer.

18. A method according to claim 17, wherein:
the contents of the message length storage means are overwritten each time a new message is received.

19. A method according to claim 17, further comprising:
f) accumulating a running total of the lengths of messages stored in the FIFO buffer; and
i) reading at least one message from the FIFO before the running total exceeds a threshold.

20. A method according to claim 17, wherein:
said steps of reading are performed by periodically polling the message length storage means.

21. A method according to claim 17, wherein:
said steps of reading are performed in response to an interrupt.

* * * * *